W. Hunter
Neck-Tie.

N° 54,168. Patented Apr. 24, 1866

Witnesses.
Theo Fusch
Wm Treurn

Wm Hunter Inventor
By his Atty

UNITED STATES PATENT OFFICE.

WILLIAM HUNTER, OF BERKELEY SPRINGS, WEST VIRGINIA.

IMPROVEMENT IN COLLARS AND NECKTIES.

Specification forming part of Letters Patent No. 54,168, dated April 24, 1866.

*To all whom it may concern:*

Be it known that I, WILLIAM HUNTER, of Berkeley Springs, in the county of Morgan and State of West Virginia, have invented a new and Improved Necktie and Collar Confiner; and I do hereby declare that the following is a full, clear, and exact description thereof, which will enable those skilled in the art to make and use the same, reference being had to the accompanying drawings, forming part of this specification.

In the wearing of collars much annoyance and uneasiness are occasioned by the difficulty experienced in having them fit snugly about the neck, and, furthermore, in "standing-up" collars this is greatly increased by the necktie continually working out of its proper place.

To remedy these objections is the object of the present invention, and is secured thereby in a satisfactory, neat, and economical manner, it consisting in attaching, either permanently or not, as may be desired or deemed most expedient, to and around that portion of the collar which comes in contact with the neck-binding of the shirt a series of one or more small and thin metallic or other suitable plates or frames having projecting outward therefrom, upon the inside and outside of the collar or upon only the former, a hook or barb made of such a shape that when the collar is buttoned about the neck they can be interlocked with the shirt-binding and thus serve to hold the collar and binding firmly and tightly together, the barbs upon the outside similarly serving to retain the necktie in contact and proper position about the collar when a standing-up collar is worn.

Figure 1:
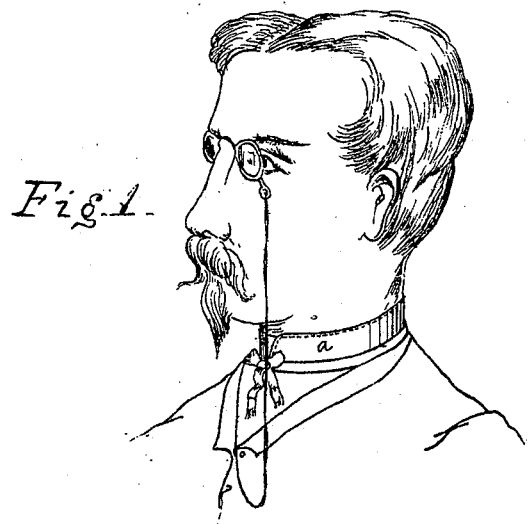
Figure 2:
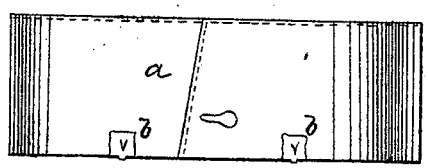
Figure 3:
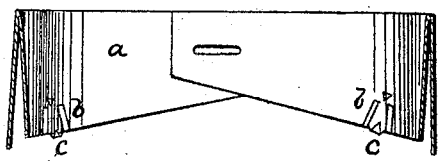
Figures 4, 5:
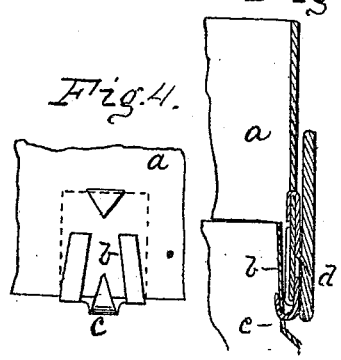
Figure 6:
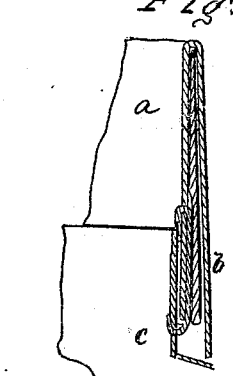

In the accompanying plate of drawings my improvements are illustrated, Figure 1 showing a view of a collar applied to a person having my improved collar and necktie confiner attached thereto; Fig. 2, a view of a standing-up collar having the same applied; Fig. 3, a cross-section of a turn-down collar; Figs. 4, 5, and 6, detail views, illustrating various adaptations of my improvement.

*a a* in the drawings represent a collar made of linen, paper, steel, or any other suitable material, or those ordinarily used therefor, and of any form, whether a standing-up or turn-down, and of any desired style or cut. To this collar *a* my improved collar and necktie confiner *b*, made of thin metal or other suitable material, is applied at and upon that portion of the same coming in contact with the neck-binding of the shirt when it is worn, which confiner, in the case of a turn-down, has a barb or hook, *c*, upon its inside only, so that it can be interlocked or engaged with the binding of the shirt, whereby it is tightly and firmly held thereto, thus making the collar comfortable and easy feeling to the neck; but when applied to a standing-up collar it is provided with a hook or barb, *d*, upon its outside as well as upon its inside, which interlocks with and firmly holds the necktie upon and about the same, as plainly seen in Fig. 4.

Any number of these confiners can be used upon the collar; but I deem two sufficient, one upon each of its sides, and half-way or about between the buttons on the front and back of the same.

More than one barb or hook may be formed upon the inside or outside of the collar, or both, and they can be made of other and various shapes than that described and represented in the drawings, and also there may be many alterations made in the detail, construction, and form of the confiner without departing from the principles of this invention, as is evident without further explanation.

I claim as new and desire to secure by Letters Patent—

As a new article of manufacture, the collar and necktie confiner made substantially as herein described, and for the purposes specified.

WM. HUNTER.

Witnesses:
PLUNKETT O. FENALL,
S. V. GILL.